United States Patent [19]

Constable

[11] Patent Number: 5,140,422

[45] Date of Patent: Aug. 18, 1992

[54] VIDEO SYNC REMOVAL CIRCUIT

[75] Inventor: Douglas W. Constable, Rochester, N.Y.

[73] Assignee: Eastman Kodak Company, Rochester, N.Y.

[21] Appl. No.: 553,494

[22] Filed: Jul. 16, 1990

[51] Int. Cl.⁵ ............................................. H04N 5/08
[52] U.S. Cl. .................... 358/153; 358/148; 358/172
[58] Field of Search .............. 358/148, 153, 154, 176, 358/171, 172

[56] References Cited

U.S. PATENT DOCUMENTS

| | | | |
|---|---|---|---|
| 4,328,514 | 5/1982 | Nakashima et al. | 358/33 |
| 4,612,576 | 9/1986 | Hinn | 358/171 |
| 4,660,085 | 4/1987 | Harwood et al. | 358/171 |
| 4,695,885 | 9/1987 | Kim | 358/168 |

FOREIGN PATENT DOCUMENTS 7806372 12/1979 Netherlands ........................ 358/172

Primary Examiner—James J. Groody
Assistant Examiner—David E. Harvey
Attorney, Agent, or Firm—David M. Woods

[57] ABSTRACT

A video sync removal circuit utilizes three bidirectional, voltage-controlled linear switches and a capacitor to remove the sync component from a video signal without introducing any non-linearities in the output video signal. The first of the switches is connected to pass the video signal through the circuit. The second switch is connected to pass the video signal to the capacitor and the third switch is connected to pass the voltage level on the capacitor to the output of the first switch. Two waveforms are generated to operate the switches: one waveform opens the first switch during the sync interval, thus blocking the sync component. The second waveform closes the second switch during a black level interval of the video signal, thus charging the capacitor to the black level. By closing the third switch during the sync interval (using the inverse of the first waveform), the black level voltage on the capacitor is substituted for the sync component in the output video signal.

9 Claims, 3 Drawing Sheets

VIDEO SYNC REMOVAL CIRCUIT

BACKGROUND OF THE INVENTION

Field of the Invention

This invention pertains to video signal processing circuits and, in particular, to video signal processing circuits that remove a synchronization pulse from a video signal.

Certain video processing applications require the removal of synchronization pulses in order to operate correctly. For example, a thermal printer responsive to a video input ordinarily processes color information without the presence of synchronization information. The typical video input available to a thermal printer, however, includes synchronization information, e.g., a video signal with a positive-going voltage for white and a negative-going voltage for the synchronization pulse (hereinafter referred to as the sync pulse or the sync component). A setup voltage immediately follows the sync pulse and closely approximates the black voltage of the video signal. (For purposes of this patent application, "black voltage" will therefore refer to the setup voltage, and will be used interchangeably therewith.) A sync removal circuit removes the sync pulse from the video signal and replaces it with a voltage representing black.

FIG. 1 shows a known circuit for removing the sync pulse from a video signal. Pertinent waveforms are shown in FIG. 2. An input video signal A is ac-coupled through a capacitor 10 to a bipolar transistor 12 arranged as an emitter follower. A clamping section includes a gating transistor 14 having its collector connected to junction 16 and its emitter connected to a transistor 18 arranged to function as a diode. The transistor 18 is forward-biased by application of a voltage B+ through a resistor 20. When a black clamp signal C is applied to the base of the transistor 14, the pulses thereof turn on the transistor 14 and clamp the corresponding portions of the ac-coupled video signal A to the collector voltage V (0.7 volts) of the forward-biased transistor 18. The resultant signal at the junction 16 is illustrated by the video waveform B. Consequently, the transistor 12 passes the portions of the video signal greater than the voltage V, that is, the portions that are positive-going from black. However, the sync pulse in lost in the video output signal D since the transistor 12 is effectively biased to cut off at the clamping level, i.e., the base-to-emitter turn-on voltage of the transistor 12.

This known circuit has several problems. Precise removal of the sync pulse depends on close matching of the voltage drop of the base-to-emitter junctions of the bipolar transistors 12 and 18. Any disparity in these voltages will either leave part of the sync pulse or cut off part of the black information. Furthermore, video levels slightly positive to black will be nonlinear because they are close to the cutoff voltage of the bipolar transistor 12.

SUMMARY OF THE INVENTION

The object of the invention is to remove the sync pulses in a video signal without introducing the non-linearities characteristic of the prior art.

Accordingly, the invention depends on the use of linear switches to replace the sync pulses with a sampled black level. The video signal includes a video picture interval, a sync interval corresponding to the sync component, and a set-up interval that substantially corresponds to a video black level. The sync removal circuit includes three linear switches, a capacitor and means for controlling the switches. A first linear switch serves to pass the video signal through the sync removal circuit. A second linear switch is connected to pass the input input video signal to the capacitor and a third linear switch is connected to pass the voltage level on the capacitor to the output of the first switch. The first switch is opened during the sync interval, thereby not allowing the sync pulse to pass through. The second switch is closed during at least a portion of the set-up interval, thus charging the capacitor to the black voltage level. By then closing the third linear switch during the sync interval, the black level voltage on the capacitor is substituted for the sync component in the output video signal.

BRIEF DESCRIPTION OF THE DRAWINGS

The invention will be described in relation to the drawings wherein.

DETAILED DESCRIPTION OF THE INVENTION

The present description will be directed mainly to elements forming part of, or cooperating more directly with, a video sync removal circuit in accordance with the present invention. Inasmuch as many video processing applications utilizing sync removal are well known, the invention will be described in connection with only one application of sync removal. Other applications for sync removal, as well as circuit elements not specifically shown or described herein, may be selected from those known in the art.

Figure 1:
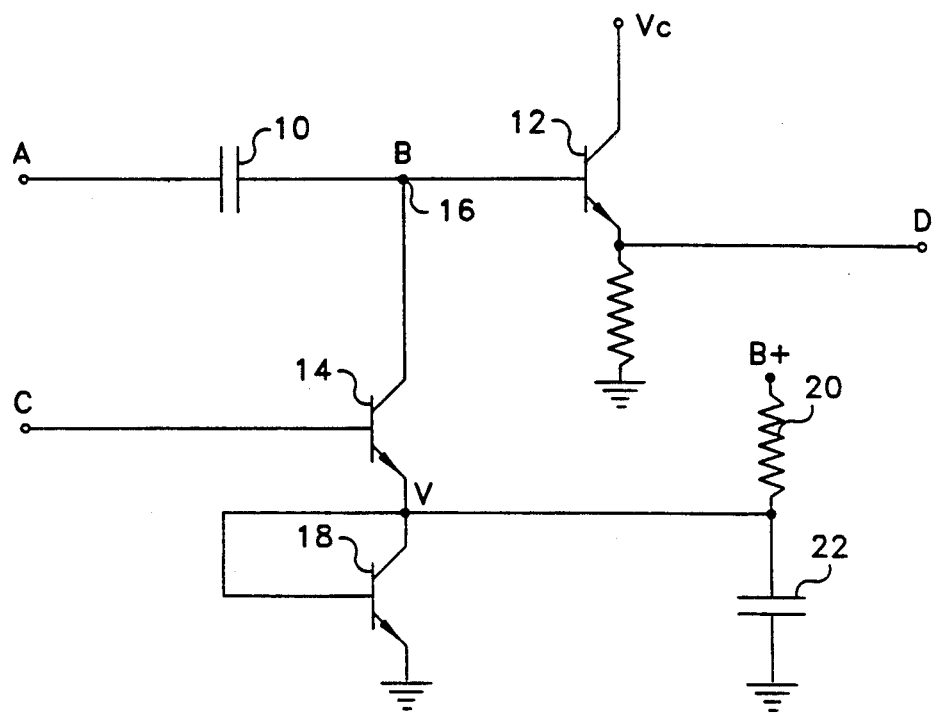
FIG. 1 is a circuit schematic of a known sync removal circuit.
Figure 2:
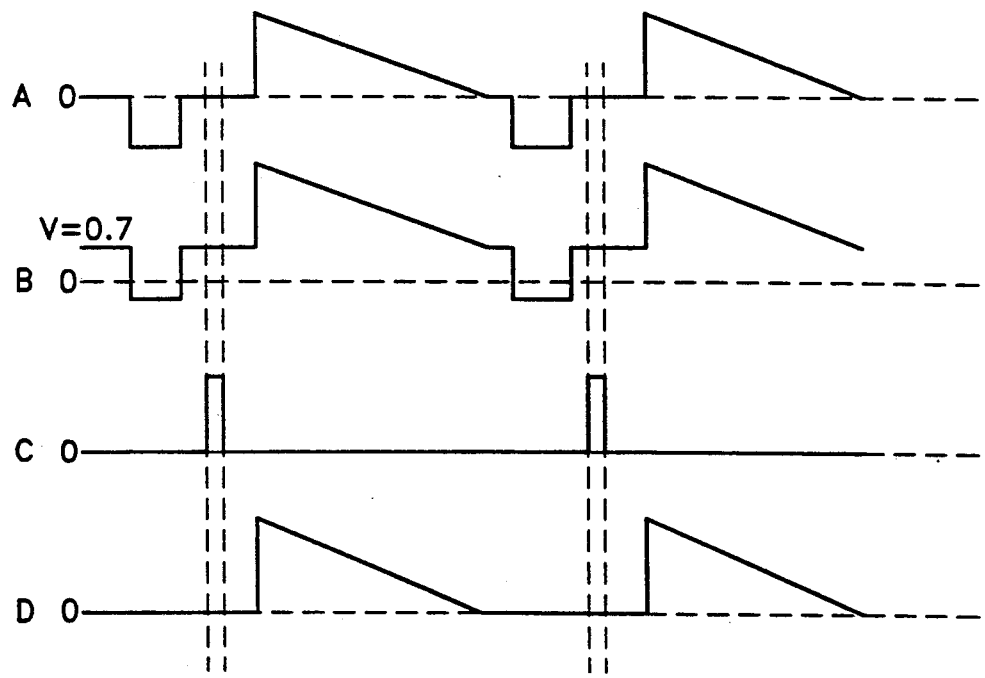
FIGS. 2(A) to (D) show waveforms of signals at several points in the circuit of FIG. 1.
Figure 3:
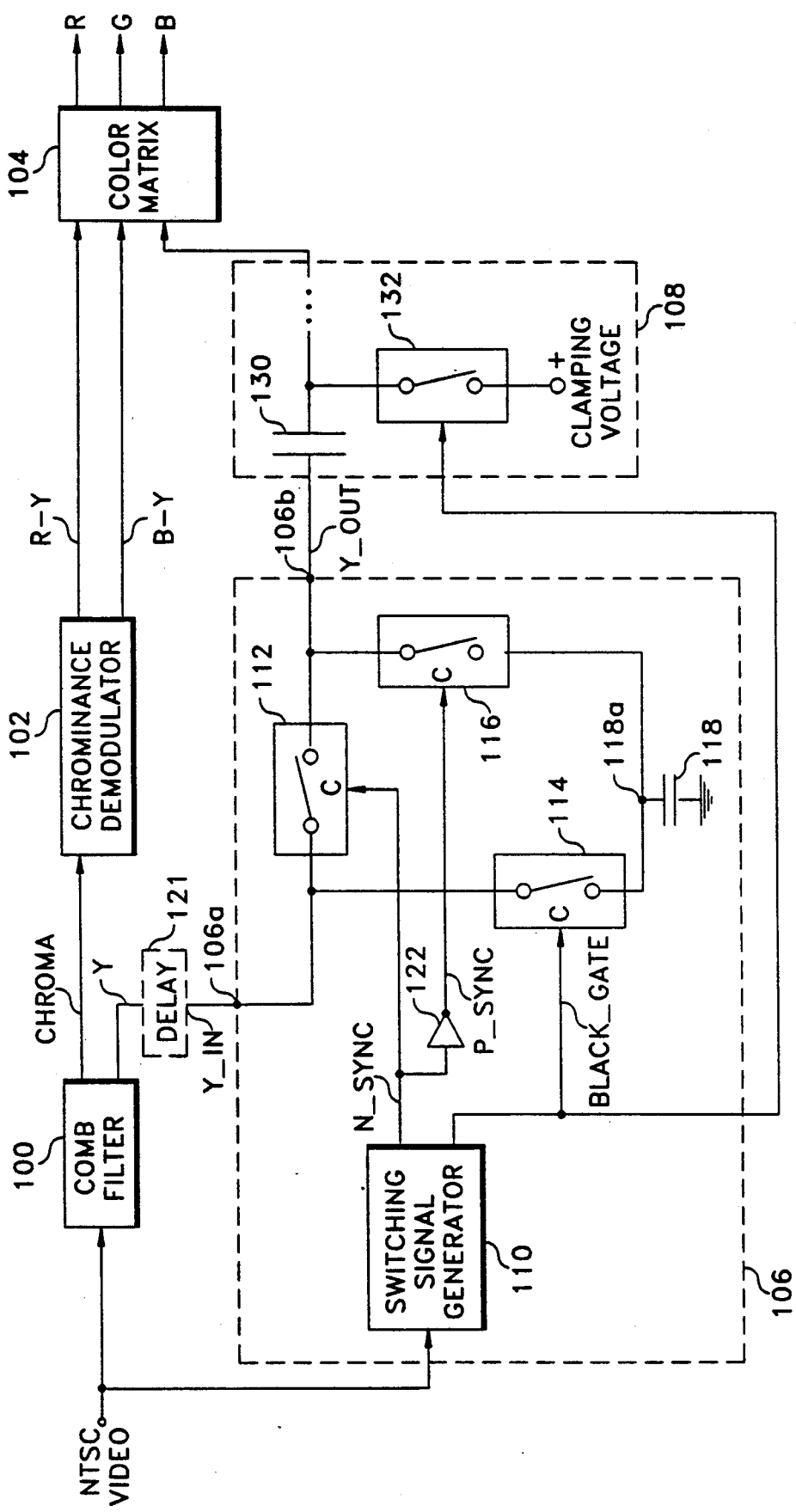
FIG. 3 is a diagram of a video circuit showing a sync removal circuit arranged according to the invention.

Turning to FIG. 3, a circuit is shown for processing a video signal including synchronization information (here shown as an NTSC composite video signal) into separate red, green, and blue (RGB) signals. The NTSC signal has typical vertical and horizontal synchronization information included in its composite video signal spectrum. The chrominance component and the luminance (Y) component are separated from the composite signal in a conventional comb filter 100. The chrominance component is further separated into color difference signals R-Y, B-Y by a conventional chrominance demodulator 102. The color difference signals R-Y, B-Y and the luminance signal Y are applied to a color matrix 104, which produces the separate RGB signals. The RGB signals are provided to a digital framestore device, (not shown) for subsequent access by a thermal printer. Since only color information is stored in the framestore and used by the printer, it is important that the signals input to the color matrix 104 be free of synchronization information. Also important, for thermal printing, is that the black levels input to the color matrix are not compressed or non linear with respect to the rest of the signal. This requirement applies principally to the luminance signal Y. While vertical and horizontal (composite) sync components can be removed by applying the principles of the invention, the circuit of FIG. 3 is used in particular to remove horizontal sync from video being input as a still image to a thermal video printer.

Figure 4:
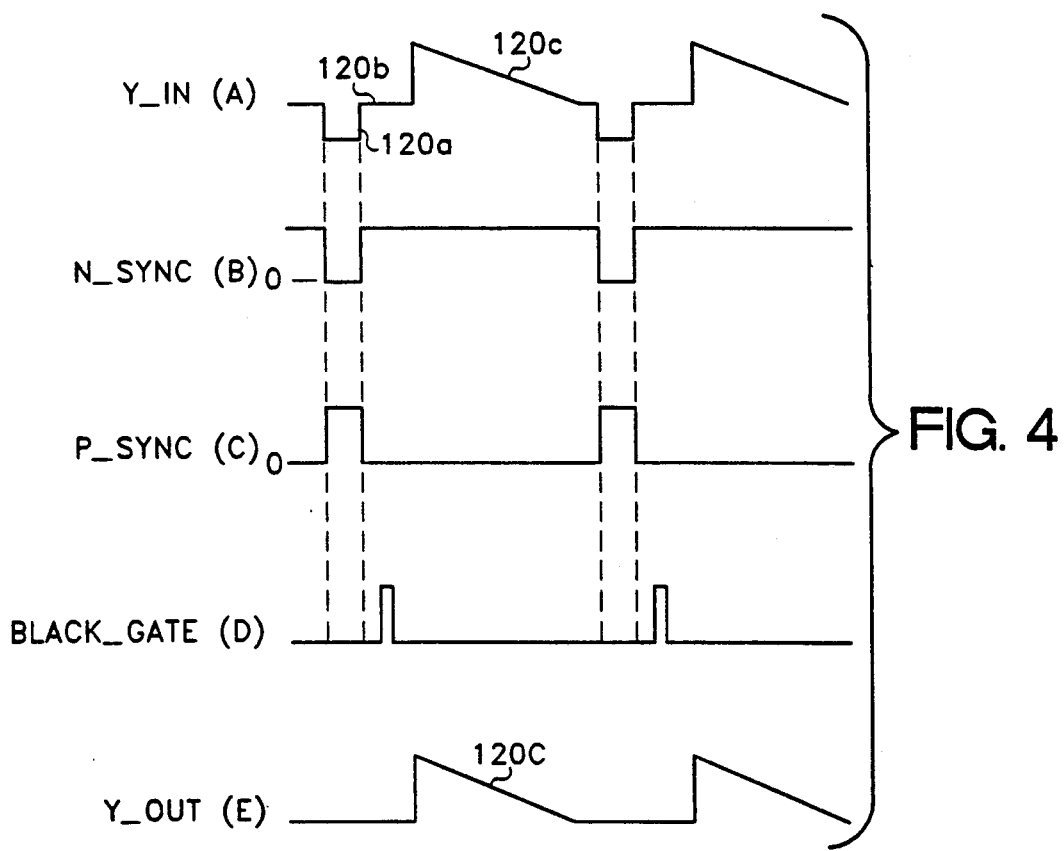
FIGS. 4(A) to (E) show waveforms of signals at several points in the sync removal circuit of FIG. 3.

The sync component is removed from the luminance signal Y by a sync removal circuit 106, which receives a signal Y_IN at an input 106a and provides an output signal Y_OUT at an output 106b. The luminance output signal Y_OUT is further Processed in one or more subsequent stages (such as stage 108) before being applied to the color matrix 104. The control signals for operating the sync removal circuit 106 are generated by a switching signal generator 110, which is connected to receive the composite video signal. The waveforms for these control signals and the luminance signals Y_IN and Y_OUT are shown in FIG. 4. The sync removal circuit 106 includes three bidirectional, voltage-controlled linear (analog) switches 112, 114, and 116 and a capacitor 118. ("Linear" is herein used to generically distinguish from bipolar transistor switches, which are not linear or analog in their transmission characteristics). Each switch has input, output, and control pins. When the voltage on the control pin is high, the resistance between the input and output is low, typically about 100 ohms, and the switch acts like a closed switch. When the control voltage is low, the resistance is very high and the switch acts like an open switch. A typical linear switch providing these characteristics is an FET linear switch, such as a 4066 CMOS analog transmission gate.

Three control signals N_SYNC, BLACK_GATE, and P_SYNC control operation of the switches 112, 114, and 116, respectively. As shown in FIG. 4, each control signal is related to the sync interval in the composite video signal, which appears as sync pulse 120a (FIG. 4(A)) in the video signal Y_IN input to the sync removal circuit 106. The video signal Y_IN also includes a set-up portion 120b, which approximately represents the black level of the video signal, and a video picture portion 120c. As shown in FIG. 4(B), the control signal N_SYNC goes low with the occurrence of the sync pulse 120. Preferably, the control signal N_SYNC goes low just before the occurrence of the sync pulse 120 in the input video signal Y_IN. (In practice a delay 121 of 50 nsec or more is provided to the video signal Y_IN before it is input to the sync removal circuit 106. The delay 121 is shown in broken line to indicate that it may instead be provided in the prior processing steps, such as in the comb filter 100.) Furthermore, the control signal N_SYNC preferably goes high slightly after the video sync interval has ended. The control signal P_SYNC is the exact inverse of the control signal N_SYNC, as taken through an inverter 122. The control signal BLACK_GATE is high during at least part of the set-up portion 120b of the input video signal Y_IN.

The first switch 112 is connected between the input 106a and the output 106b of the sync removal circuit 106 so as to receive and pass the input video luminance signal Y_IN when the switch 112 is closed. The control signal N_SYNC is applied to the control pin of the switch 112, which causes the switch 112 to pass the video signal Y_IN at all times except during the sync interval 120. The second switch 114 is connected between the input 106a and a circuit terminal 118a of the capacitor 118, and the third switch 116 is connected between the output 106b and the circuit terminal 118a of the capacitor 118. The opposite side of the capacitor 118 is grounded. The control signal P_SYNC, which is the inversion of the signal N_SYNC, is applied to the control pin of the switch 116 and closes the switch 116 during the sync interval 120a. The control signal BLACK_GATE, which is high during at least part of the black portion 120b of the video signal, is applied to the control pin of the switch 114 and closes the switch 114 during the black portion 120b.

In operation, the video signal Y_IN input to the sync removal circuit 106 is applied simultaneously to the switches 112 and 114. A sequence of video fields (or frames) are applied to the input 106a. The control signal BLACK_GATE closes the switch 114 during the black portion 120b of the video signal, which charges the capacitor 118 to the black level of the video signal Y_IN. This black level voltage is held on the capacitor 118 after the switch 114 is opened. The control signal N_SYNC opens the switch 112 during(or, preferably, just before) the sync pulse 120a in a subsequent line of the video signal. The video sync pulse 120, therefore, is not passed through the switch 112 to the output 106b. Instead, the control signal P_SYNC closes the switch 116 during this period and replaces the video sync pulse 120a with the black voltage held on the capacitor 118. Thus the output video signal Y_OUT has the video portion 120c without any sync information.

The video output signal Y_OUT is ac-coupled through a capacitor 130 in the subsequent stage 108, which may require a different dc bias of the video signal for the next stage of video processing. It is convenient to provide a switch 132 between the output of the capacitor 130 and a clamping voltage, and then to activate the switch 132 with the control signal BLACK_GATE. The switch 132 will consequently close during the black portion 120b of the video signal and clamp the black level to the desired clamping voltage. This can be repeated for as many stages as desired.

The advantage of the foregoing arrangement is that the picture portion 120c of the video signal is passed through an active device, the switch 112, that is completely "on", i.e., the voltage of the video signal is never close to the cutoff voltage of a bipolar transistor and linearity is not compromised. In addition, the circuit 106 handles either positive-going or negative-going sync pulses without any circuit change. Unlike the prior art circuits, this sync removal circuit does not depend on matching the forward-biased voltage drops of active devices, thus eliminating the necessity of alignment. Finally, the circuit 106 does not alter portions (not shown) of a video signal that may extend below black (blacker than black).

The invention has been described in detail with particular reference to a presently preferred embodiment, but it will be understood that variations and modifications can be effected within the spirit and scope of the invention.

What is claimed is:

1. A circuit for removing the sync component of a video signal having a video picture interval, a sync interval corresponding to the sync component, and a set-up interval that substantially corresponds to a video black level, said circuit comprising:
   a signal generator for generating switching signals;
   a first linear switch for receiving the video signal and for providing an output video signal at an output thereof;
   a capacitor for storing a voltage level;
   a second linear switch connected to pass the video signal to said capacitor;

a third linear switch connected to pass the voltage level on said capacitor to the output of said first switch;

means for opening said first switch during the sync interval, said opening means comprising a first switching signal provided by said signal generator that causes said first switch to continuously pass the video signal except during the sync interval, whereby the sync component does not pass to said output thereof;

means for closing said second switch during at least a portion of the set-up interval, whereby said capacitor is charged to the black voltage level; and means for closing said third switch during the sync interval, whereby the black level voltage on the capacitor is substituted for the sync component in the output video signal.

2. A circuit as claimed in claim 1 wherein said means for opening said second switch comprises a second switching signal, provided by said signal generator, that causes said second switch to pass the video signal only during said portion of the set-up interval.

3. A circuit as claimed in claim 1 wherein said means for opening said third switch comprises a third switching signal that is the inverse of said first switching signal, said third switch passing the black voltage level on the capacitor to the output of said first switch during the sync interval.

4. A circuit as claimed in claim 1 wherein said first switching signal opens said first switch from a time just prior to the occurrence of the sync component until a time just after the occurrence of the sync component.

5. A circuit as claimed in claim 1 wherein said first, second, and third linear switches are CMOS transmission gates.

6. A circuit as claimed in claim 2 wherein said second switching signal is passed to one or more subsequent circuits for clamping the output video signal to a clamping voltage provided in said one or more subsequent circuits.

7. A sync removal circuit for receiving a video signal with a sync component at an input terminal and for providing a video signal without the sync component at an output terminal, said video signal having a video picture interval, a sync interval corresponding to the sync component, and a set-up interval that substantially corresponds to a black level, said circuit comprising:

a signal generator for generating a first control signal having a switch opening pulse during the sync interval and a second control signal having a switch closing pulse during the set-up interval;

a capacitor connected between ground and a circuit terminal;

a first bidirectional, voltage-controlled linear switch connected to pass the video signal between the input terminal and the output terminal, said first switch responsive to said first control signal so as to continuously pass the video signal except during the sync interval, thereby not passing the sync component;

a second bidirectional, voltage-controlled linear switch connected between the input terminal and the circuit terminal, said second switch responsive to said second control signal so as to close during the set-up interval and charge said capacitor to the black level; and a third bidirectional, voltage-controlled linear switch connected between the output terminal and the circuit terminal, said third switch responsive to the inverse of said first control signal so as to close during the sync interval and thereby insert the black voltage level on the capacitor into the video signal in place of the sync component.

8. A circuit as claimed in claim 7 in which the duration of the switch opening pulse of said first control signal extends from a time just prior to the beginning of the sync interval to a time just after the end of the sync interval.

9. A circuit as claimed in claim 7 in which said first, second, and third linear switches are CMOS transmission gates.

* * * * *